(12) United States Patent
Raja

(10) Patent No.: US 7,747,705 B1
(45) Date of Patent: Jun. 29, 2010

(54) METHOD TO MAKE A DISCUSSION FORUM OR RSS FEED A SOURCE FOR CUSTOMER CONTACT INTO A MULTIMEDIA CONTACT CENTER THAT IS CAPABLE OF HANDLING EMAILS

(75) Inventor: Moiz Raja, Milpitas, CA (US)

(73) Assignee: Avaya Inc., Basking Ridge, NJ (US)

( * ) Notice: Subject to any disclaimer, the term of this patent is extended or adjusted under 35 U.S.C. 154(b) by 467 days.

(21) Appl. No.: 11/745,540

(22) Filed: May 8, 2007

(51) Int. Cl.
*G06F 15/16* (2006.01)

(52) U.S. Cl. .............. 709/219; 709/201; 709/202; 709/203; 709/204; 709/206

(58) Field of Classification Search .............. 709/219
See application file for complete search history.

(56) References Cited

U.S. PATENT DOCUMENTS

| | | | |
|---|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |

(Continued)

FOREIGN PATENT DOCUMENTS

CA 2143198 1/1995

(Continued)

OTHER PUBLICATIONS

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

(Continued)

*Primary Examiner*—Thu Nguyen
*Assistant Examiner*—Neeraj Utreja
(74) *Attorney, Agent, or Firm*—Sheridan Ross P.C.

(57) ABSTRACT

The present invention is directed to a contact center configured to convert post notifications from a forum or blog server into work items for distribution to an appropriate agent and forward agent responses to the forum or blog server as a responsive post.

20 Claims, 5 Drawing Sheets

U.S. PATENT DOCUMENTS

| | | |
|---|---|---|
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | McNerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,356,633 B1 * | 3/2002 | Armstrong ............. 379/265.11 |
| 6,366,668 B1 | 4/2002 | Borst et al. |
| 6,389,028 B1 | 5/2002 | Bondarenko et al. |
| 6,389,132 B1 * | 5/2002 | Price .................... 379/265.01 |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,684,248 B1 * | 1/2004 | Janacek et al. ............. 709/217 |
| 6,697,457 B2 | 2/2004 | Petrushin |
| 6,704,409 B1 | 3/2004 | Dilip et al. |
| 6,707,903 B2 | 3/2004 | Burok et al. |
| 6,754,333 B1 | 6/2004 | Flockhart et al. |
| 6,766,013 B2 | 7/2004 | Flockhart et al. |

| | | | |
|---|---|---|---|
| 6,766,014 | B2 | 7/2004 | Flockhart et al. |
| 6,947,543 | B2 | 9/2005 | Alvarado et al. |
| 7,035,927 | B2 | 4/2006 | Flockhart et al. |
| 7,092,509 | B1 * | 8/2006 | Mears et al. ............ 379/265.02 |
| 7,222,075 | B2 | 5/2007 | Pertrushin |
| 2002/0035474 | A1 | 3/2002 | Alpdemir |
| 2002/0087520 | A1 * | 7/2002 | Meyers ........................... 707/3 |
| 2002/0165745 | A1 | 11/2002 | Greene et al. |
| 2003/0174830 | A1 | 9/2003 | Boyer et al. |
| 2003/0177009 | A1 | 9/2003 | Odinak et al. |
| 2003/0177017 | A1 | 9/2003 | Boyer et al. |
| 2004/0058694 | A1 * | 3/2004 | Mendiola et al. ............ 455/466 |
| 2004/0203878 | A1 | 10/2004 | Thomson |
| 2005/0152378 | A1 | 7/2005 | Bango et al. |
| 2005/0177368 | A1 | 8/2005 | Odinak |
| 2005/0193055 | A1 | 9/2005 | Angel et al. |
| 2006/0047615 | A1 | 3/2006 | Ravin et al. |
| 2006/0129477 | A1 | 6/2006 | Goodwin et al. |
| 2006/0178918 | A1 | 8/2006 | Mikurak |
| 2007/0043766 | A1 | 2/2007 | Nicholas et al. |
| 2007/0244901 | A1 * | 10/2007 | Mohler et al. ................. 707/10 |

FOREIGN PATENT DOCUMENTS

| | | |
|---|---|---|
| CA | 2174762 | 6/1995 |
| EP | 0501189 | 9/1992 |
| EP | 0740450 | 10/1996 |
| EP | 0772335 | 5/1997 |
| EP | 0855826 | 7/1998 |
| EP | 0829996 | 9/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality In IP Voice Networks," Avaya, Inc., 2002, pp. 1-17.
Dawson, "NPRI's Powerguide, Software Overview" Call Center Magazine (Jun. 1993), p. 85.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 8 pages.
Foster, Robin, et al., "Avaya Business Advocate and its Relationship to Multi-Site Load Balancing Applications," Avaya, Inc., Mar. 2002, 14 pages.
GEOTEL Communications Corporation Web site printout entitled "Intelligent CallRouter" Optimizing the Interaction Between Customers and Answering Resources. 6 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
MIT Project Oxygen, Pervasive, Human-Centered Computing (MIT Laboratory for Computer Science) (Jun. 2000) pp. 1-15.
Presentation by Victor Zue, The MIT Ox90ygen Project, MIT Laboratory for Computer Science (Apr. 25-26, 2000) 9 pages.
Stevenson et al.; "Name Resolution in Network and Systems Management Environments"; http://netman.cit.buffalo.edu/Doc/DStevenson/NR-NMSE.html; 16 pages.
"Blog—Wikipedia, the free encyclopedia", available at http://en.wikipedia.org/wiki/Blog, printed Mar. 1, 2007, 12 pages.
"E-Mail Alerts and RSS Feeds", available at http://scitation.aip.org/html/APS/alert.jsp, printed Mar. 1, 2007, 2 pages.
"GMailRSS: Gmail as an RSS reader", available at http://www.cs.utexas.edu/~karu/gmailrss/, last modified Aug. 22, 2005, 8 pages.
"Internet forum—Wikipedia, the free encyclopedia", available at http://en.wikipedia.org/wiki/Discussion_forum, printed Mar. 1, 2007, 6 pages.
"RSS—Wikipedia, the free encyclopedia", available at http://en:wikipedia.org/wiki/RSS, printed Mar. 1, 2007, 11 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09,html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.

* cited by examiner

METHOD TO MAKE A DISCUSSION FORUM OR RSS FEED A SOURCE FOR CUSTOMER CONTACT INTO A MULTIMEDIA CONTACT CENTER THAT IS CAPABLE OF HANDLING EMAILS

FIELD OF THE INVENTION

The invention relates generally to contact centers and particularly to multimedia contact centers having electronic mail handling capabilities.

BACKGROUND OF THE INVENTION

Today, Internet enabled group discussion vehicles are widely used by support organizations to help customers with issues that they are facing with the organization's products and by sales organizations to sell products or services.

One type of group discussion vehicle is a discussion forum, also known as an Internet forum, web forum, message board, discussion board, (electronic) discussion group, discussion forum, bulletin board, fora, or simply forum. Forums are facilities on the World Wide Web for holding discussions and posting user generated content.

Forums generally include a website composed of a number of member-written threads. Each thread entails a discussion or conversation in the form of a series of member-written posts and may refer to a posted topic. Stated another way, forums are containers for threads started by a community of users. Threads in a forum are either flat (posts are listed in chronological order) or threaded (each post is made in reply to a parent post).

Depending on the permissions of community members as defined by the board's administrator, members can post replies to existing threads, start new threads, edit their posts, start new topics, and change their settings. On most forums, users have a small picture or avatar located around their name. Forums can be configured to allow visitors to post anonymously or require members to attribute posts to a registered username.

Forums come in complex and varying styles. Commonly, forums contain many different boards that direct a user to a sub-forum. Forums differ from electronic mailing lists in that mailing lists deliver automatically new messages to the subscriber while forums require the member to visit the website and check for new posts. Due to the possibility of members missing replies to threads they are interested in, many modern forums offer an email notification feature, where an email is sent automatically to all users, who have chosen to be notified of new replies, informing them that a new post has been made, and RSS feeds (discussed below) that allow people to see the summary of the new posts using an aggregator software. Forums differ from chat rooms and instant messaging because forum participants do not have to be online at the same time; forums also usually deal with one topic and personal exchanges are commonly discouraged.

Another type of group discussion vehicle is a blog. A blog is a user-generated website where entries are made in journal style and displayed in a reverse chronological order. Blogs often provide commentary or news on a particular subject, such as a manufacturer's products, services, politics, or local news. In the context of a blog, threads are topical connections between messages such as on a metaphorical "corkboard".

Blogs come in varying types that differ in the way the content is delivered or written. Blogs are classified by the media type used by the blog (e.g., vlogs (or blogs including videos), linklogs (or blogs including links), sketchblogs (or blogs including sketches), photoblogs (or blogs including photos), and tumblelogs (or blogs having shorter posts and mixed media types)), the device used to compose the blog (e.g., moblogs (or blogs written by a mobile device such as a mobile phone or Personal Digital Assistant), and blog subject or genre (e.g., political blogs, travel blogs, fashion blogs, project blogs, or legal blogs (known as blawgs)). Unlike blogs, forums typically allow anyone to start a new discussion (or thread) or reply to an existing thread.

Forums and blogs frequently use RSS to facilitate publication of information. RSS is a family of web feed formats used to publish frequently updated digital content. "RSS" variously refers to Really Simple Syndication (RSS 2.0), Rich Site Summary (RSS 0.91 and RSS1.0), and RDF Site Summary (RSS 0.9 and 1.0).

Users of RSS content use programs called feed readers or aggregators. Users subscribe to a feed by supplying to their reader a link to the feed. The reader can then check the user's subscribed feeds to determine if any of those feeds have new content since the last time it checked and, if so, retrieve that content and present it to the particular user. RSS delivers its information as an XML file called an "RSS feed", "webfeed", "RSS stream", or "RSS channel." A new syndication specification, known as Atom, improves on RSS by relying on standard XML features, by specifying a payload container that can handle many different kinds of content unambiguously.

When forums and blogs are used by contact centers, each customer query is treated as a new work item for the center. The way that work is distributed to the contact center agents, however, is unmodulated resulting in wasted resources. Modulating work assignment based on the type and quantity or work currently assigned to an agent is the domain of the multimedia contact center. A multimedia contact center is capable of using complex rules to determine which agent a particular piece of work should be assigned to. It would be ideal, if work generated by a discussion forum or blog could be routed using a multimedia contact center.

From a contact center perspective, using a discussion forum or blog as a source has several advantages. For example, a discussion forum or blog can be viewed and searched by customers with similar issues. This search capability results in solutions to problems being found by the customers without contact center agent involvement. A discussion forum or blog populated with the right type of information can serve as a channel to advertise and sell products in a much more targeted fashion. A discussion forum or blog allows community members to answer posts as well. This further reduces the burden on an agent in the contact center to answer the questions.

However, to realize the value that a discussion forum or blog brings to the table, the work sourced by the discussion forum has to enter the contact center in a form that can be modulated effectively by the contact center. Otherwise, multiple agents may respond to the same post, which leads to contact center inefficiencies.

SUMMARY OF THE INVENTION

These and other needs are addressed by the various embodiments and configurations of the present invention. The present invention is directed to a contact center architecture for receiving and responding to post notifications received from a forum or blog server.

In one embodiment, the present invention is directed to a method including the steps of:

(a) receiving, from a forum and/or blog server, a first text message addressed to a contact server in the contact center;

(b) directing the first text message to a first contact center inbox associated with the forum and/or blog server; and (c) from the first contact center inbox, directing the first text message or a message derived therefrom to an agent for servicing.

The first contact center inbox is commonly associated with a specific forum or blog server and/or subpart thereof, such as a sub-forum, topic, or thread.

In a second embodiment, the present invention is directed to a method including the steps of:

(a) receiving from an agent a response to a work item, the work item being associated with a posting to a forum and/or blog server;

(b) directing the response to a first contact center inbox associated with a customer, the customer in turn being associated with the posting to the forum and/or blog server; and (c) from the contact center inbox, directing the response or a message derived therefrom to the forum and/or blog server.

This embodiment can track effectively contact center interactions with customers (also known as maintaining contact history). The first text message, which is typically a post notification in the form of an email or RSS feed, is parsed to identify not only the topic of the message but also the identity of the party responsible for the post. A customer inbox is created that is associated with the particular posting party. The work item includes an address associated with the customer inbox, which may be the email address of the identified party. When the agent responds to the work item, the response is received by the customer inbox. The response is converted into a responsive post and forwarded to the forum or blog server.

The present invention can provide a number of advantages depending on the particular configuration. The invention can provide an effective means to provide a contact center service channel for postings to a forum or blog server. As noted, the channel can be configured to track effectively interactions with customers responsible for postings to the forum or blog server. It can allow forums and blogs to be used as channels for contact centers without requiring infrastructure changes in the contact center itself and while preserving the contact center's ability to serve real time communication channels, such as voice and chat, preferentially. The preferred requirement is that the contact center support email as a channel.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The exemplary systems and methods of this invention will be described in relation to Internet-enabled group discussion vehicles. However, to avoid unnecessarily obscuring the present invention, the following description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch or server, or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

Figure 1:
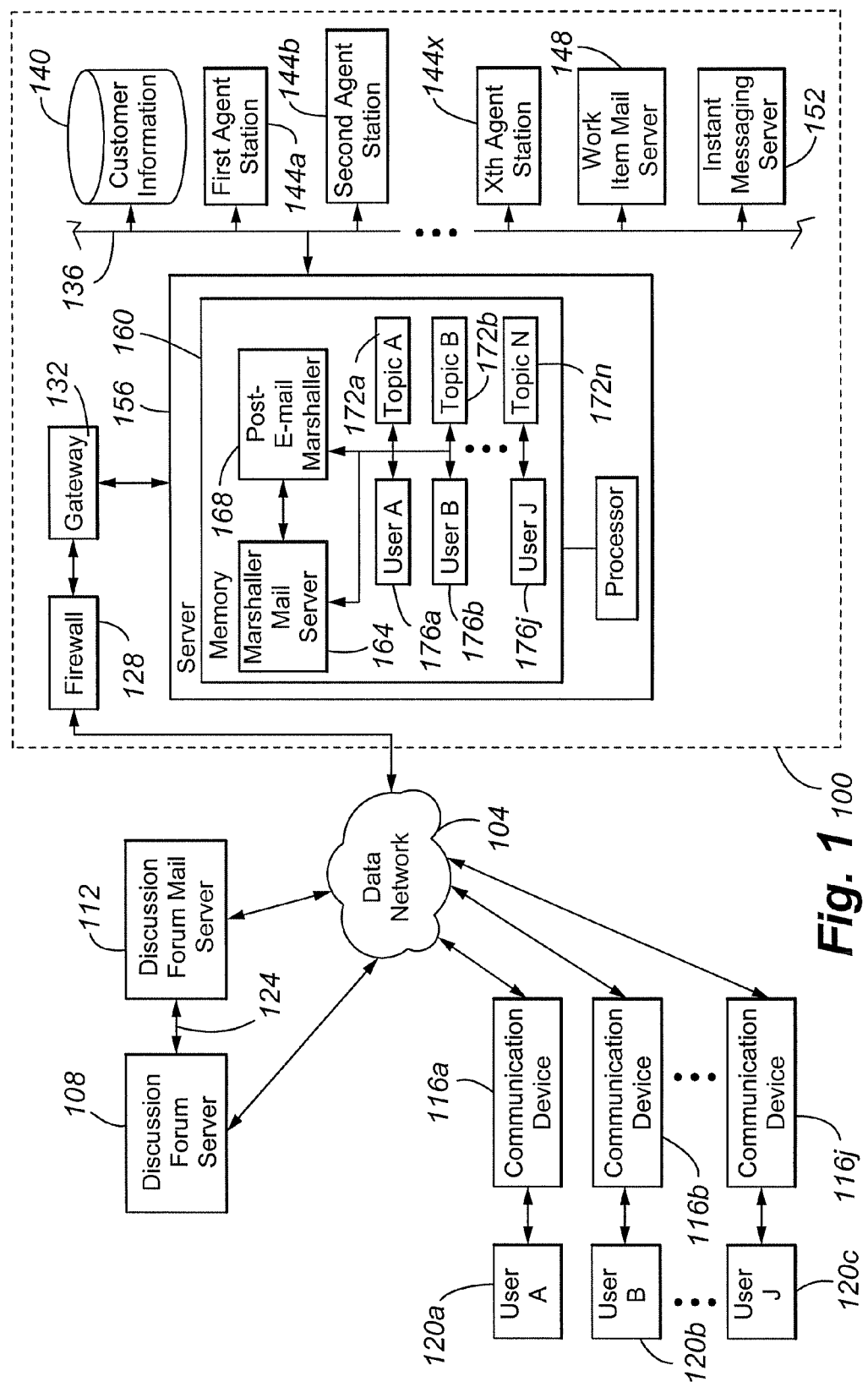
FIG. 1 is a block diagram of a contact center architecture according to an embodiment of the present invention.

Referring to FIG. 1, the contact center architecture comprises a discussion forum server 108 and discussion forum mail server 112 connected by a data network 104 to a plurality of communication devices 116a-j having associated users 120a-j and a contact center (or enterprise network) 100.

The discussion forum server 108 and associated mail server 112 are interconnected by Local Area Network or LAN 124. The server 108 can be any suitable server running forum software. Forum software packages are widely available and are written in a variety of programming languages, such as PHP, Perl, Java, and ASP. The configuration and records of posts are stored in text files or in a database (not shown). The server 108 can offer a variety of features from offering text-only postings to more elaborate capabilities, such as offering multimedia support and formatting code (known as BBCode). The mail server 112 can be any suitable electronic message server, with email being preferred.

The data network 104 is preferably a Wide Area Network or WAN. The network 104 can be any distributed network, whether packet-switched or circuit-switched. In one configuration, the network 104 includes a packet-switched network, such as the Internet.

The communication devices 116a-j are preferably packet-switched communication devices, such as Personal Digital Assistants or PDAs, Personal Computers or PCs, mobile phone, and laptops. The users 120a-j are external to the contact center 100 and authorized to post content to and receive content from the discussion forum server 108. Typical users are customers or potential customers of the business associated with the contact center.

The contact center 100 includes a number of computational components, including firewall 128, gateway 132, LAN 136, customer information storage 140, first, second, . . . Xth agent stations 144a-x, work item mail server 148, instant messaging server 152, and server 156.

The firewall 128 can be any suitable combination of hardware and software that limits the exposure of the other components of the contact center 100 to an attack from the outside. For example, the firewall 128 can be a network-level or application-level firewall.

The gateway 132 can be any suitable device for controlling ingress to and egress from the corresponding LAN 136. The gateway is positioned logically between the other components in the corresponding enterprise premises and the network 104 to process communications passing between the appropriate switch/server and the second network. The gateway 132 typically includes an electronic repeater functionality that intercepts and steers electrical signals from the network 104 to the corresponding LAN 136 and vice versa and provides code and protocol conversion. Additionally, the gateway can perform various security functions, setting up and using secure tunnels to provide virtual private network capabilities. In some protocols, the gateway bridges conferences to other networks, communications protocols, and multimedia formats. Examples of suitable gateways include Avaya Inc.'s, G700™, G650™, G350™, MCC/SCC™ media gateways and Acme Packet's Net-Net 4000 Session Border Controller. As will be appreciated, the firewall 128 and gateway 132 functionality can be integrated in a single device.

The customer information storage 140 is a set of data stores or databases containing contact or customer related information and other information that can enhance the value and efficiency of the contact. The information includes, for example, customer name, customer account information, customer contact information (e.g., email address, instant messaging handle, phone number, etc.), customer purchase history, customer classification (e.g., gold, silver, bronze, etc.), customer interests/needs, and the like.

The first, second, . . . Xth stations 144a-x are preferably packet-switched stations or communication devices internal to the contact center, such as Personal Digital Assistants or PDAs, Personal Computers or PCs, mobile phone, and laptops. The contact center, or agents thereof, are authorized to post content to and receive content from the discussion forum server 108. The agents may be human or automated.

The server 156 is a software-controlled device that directs communications, such as incoming Voice Over IP or VoIP and telephone calls, in the enterprise network 100. The term "server" as used herein should be understood to include an ACD, a Private Branch Exchange PBX (or Private Automatic Exchange PAX) an enterprise switch, an enterprise server, or other type of telecommunications system switch or server, as well as other types of processor-based communication control devices such as media servers, computers, adjuncts, etc. The server can be any architecture for directing contacts to one or more communication devices. Illustratively, the switch and server of FIG. 1 can be a modified form of Avaya Inc.'s Definity™ Private-Branch Exchange (PBX)-based ACD system or MultiVantage™ PBX running modified Advocate™ software, CRM Central 2000 Server™, Communication Manager™, S8300™ media server, SIP Enabled Services™, and/or Avaya Interaction Center™

Included in the memory 160 of the server 156 are a marshaller mail server 164, post-email marshaller 168, a plurality of topical inboxes 172a-n, and a plurality of user inboxes 176a-j. These components collectively marshal discussion forum posts between users 120a-j and the contact center as electronic messages, preferably emails. The contact center is then able to allocate the electronic messages to agents using existing contact center work distribution rules. The user inboxes permit the contact center to maintain contact history.

The post-email marshaller 168 is preferably an email client capable of monitoring multiple mail inboxes on the marshaller mail server 164. The inboxes are the user inboxes 176a-j and topic or discussion forum inboxes 172a-n. Each of the user inboxes 176-a-j represents and corresponds to a single discussion forum user 120a-j. Electronic messages from the work item mail server 148 are received in the user inboxes 176a-j. This ensures that the contact center can maintain user related information together. Although depicted as corresponding to a topic, each of the topic inboxes 172a-n can correspond not only to a topic but also (alternatively) to a forum, sub-forum, and/or thread, and/or topic depending on the application.

The operation of an embodiment of the present invention will now be discussed with reference to FIGS. 2-3. Prior to step 300 of FIG. 3, a contact center component, typically the marshaller mail server 164 has directly subscribed to the discussion forum server 108 requesting notification of all posts to the forum. Alternatively, an administrator manually subscribes to threads on behalf of the marshaller mail server 164. When a post 204 is received by the discussion forum mail server 112 from a user 120, the post 204 is forwarded to the discussion forum server 108 for publication to the community of users 120a-j. As part of publication, the server 108 forwards a notify message 208 to each of the forum subscribers, which includes users 120a-j and contact center 100. The notify message 208 is typically an email including the forum mail server's address as the sender. Embedded in the email is also the email address of the user who is responsible for the post 204. Notification messages are sent by the server 108 forwarding the notify message to the mail server 112, which forwards the notify message 208 to the various subscribers. In the case of the contact center 100, the notify message 208 is received by the marshaller mail server 164 and placed in a topic inbox 172 corresponding to the forum, sub-forum, thread, and/or topic. Commonly, the forum email address is used to place the notify message 208 into the appropriate inbox. In other words, each topic inbox 172 typically corresponds to a particular forum email address.

Figure 2:
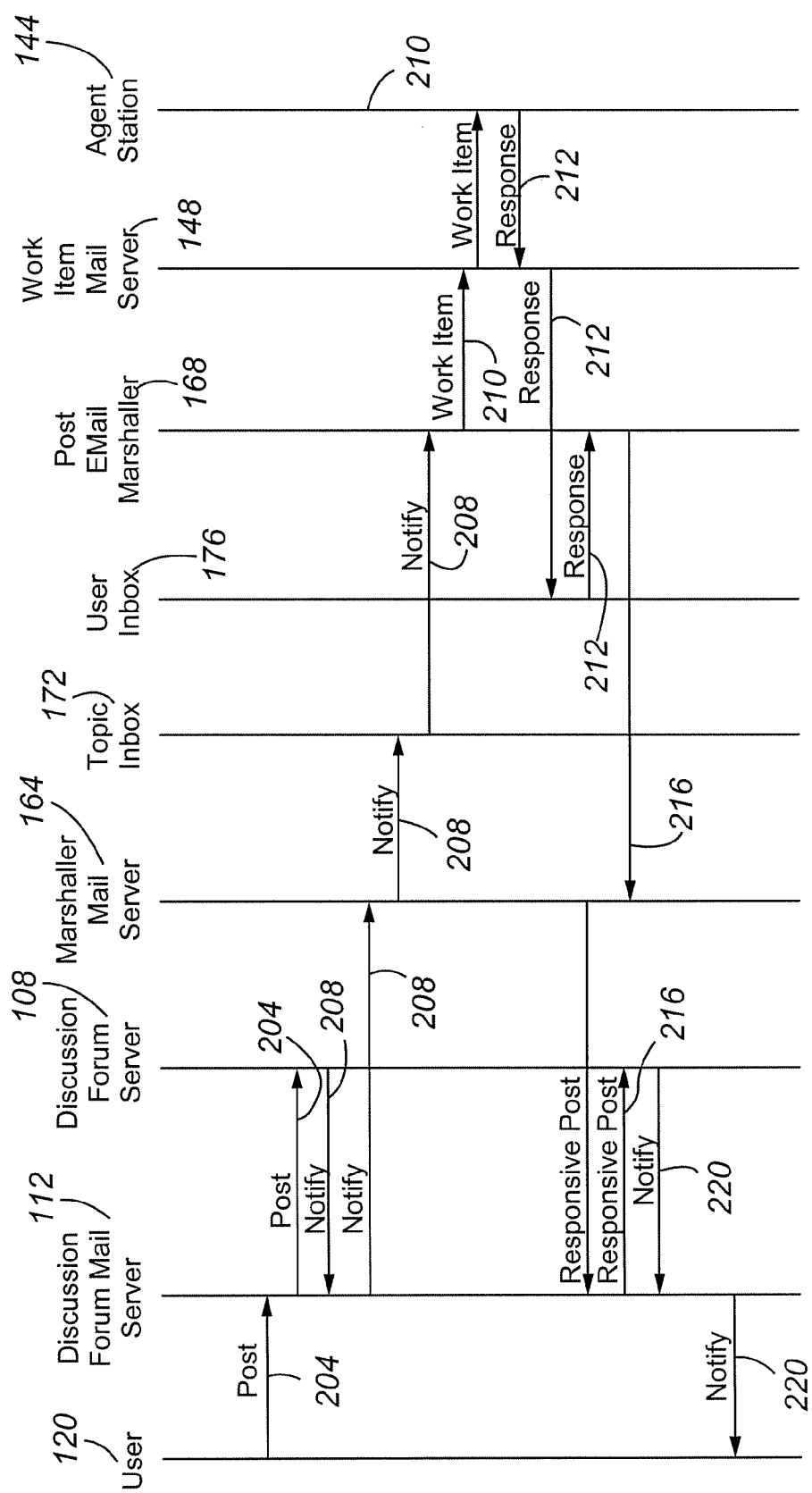
FIG. 2 is signal flow diagram according to an embodiment of the present invention.
Figure 3:
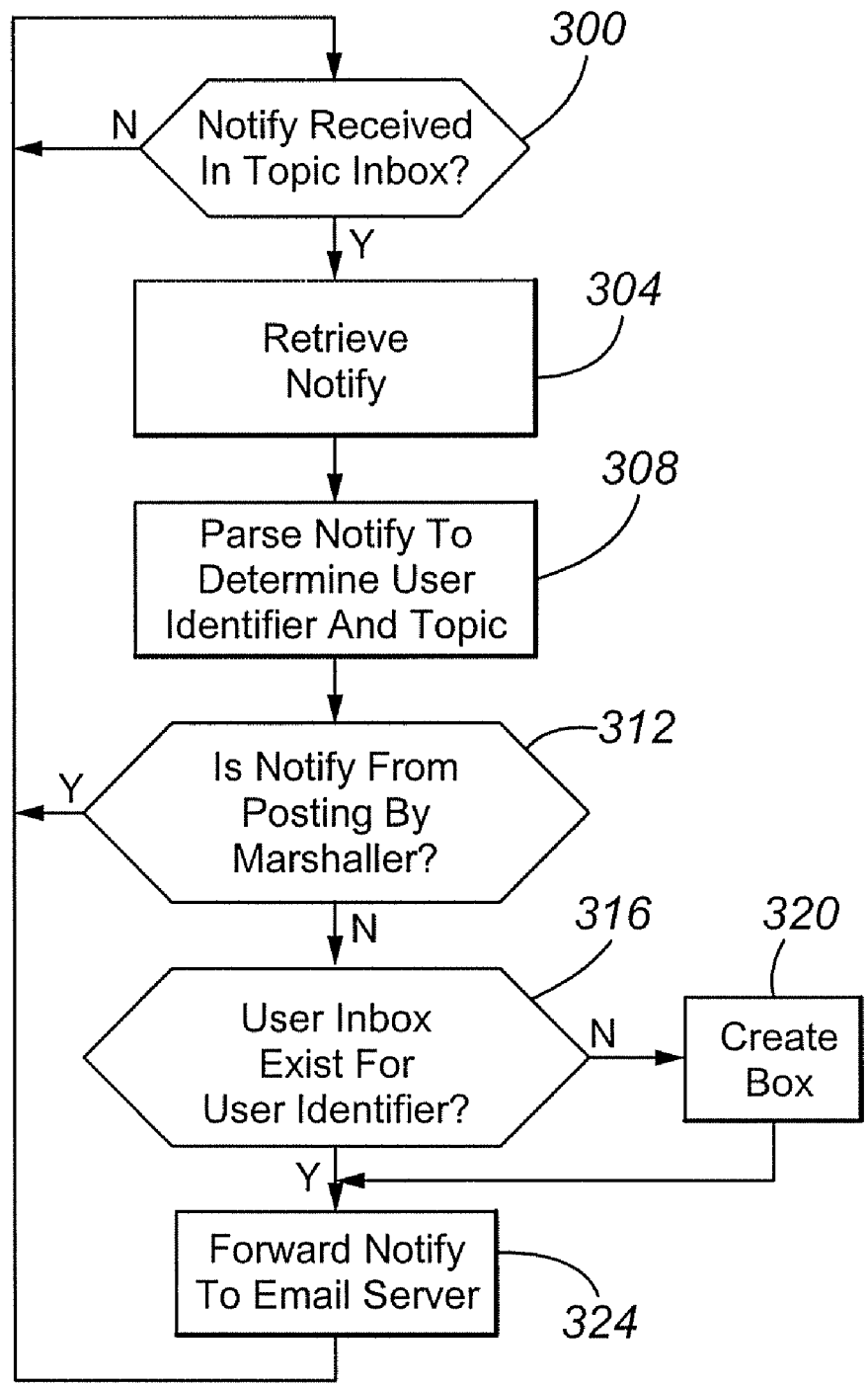
FIG. 3 is a flow schematic according to an embodiment of the present invention.

Referring now to FIG. 2, the post-email marshaller 168 monitors the topic inboxes for notify messages by periodically or continuously performing decision diamond 300. When the new notify message 208 is received in an inbox 172, the marshaller 168, the marshaller 168, in decision diamond 300, determines that the new notify message 208 has been received and, in step 304, retrieves the notify message 208.

In step 308, the marshaller 168 parses the notify message 208 to determine the posting user identifier (e.g., name, email address, or other type of user identifier) and the topic of the message (which may be self-evident from the internal description of the inbox 172 that received the notify message 208).

In decision diamond 312, the marshaller 168 determines whether the notify message was generated to provide notification of a posting by the contact center. This is determined by the user identifier. When the notify message 208 provides notification of a posting by the contact center, the marshaller 168 returns to and repeats decision diamond 300 and discards the notify message 208. When the notify message 208 does not provide notification of a posting by the contact center, the marshaller 168 proceeds to decision diamond 316.

In decision diamond 316, the marshaller 168 determines whether a user inbox 176 currently exists for the user having the identifier obtained in step 308. If an inbox does not currently exist for the particular user, the contact center, in step 320 creates an inbox. This is typically done by creating an email account for the user. The email account commonly includes a pointer to the customer profile for the user in storage 140.

After completing step 320 or when a user inbox 176 currently exists for the particular user, control passes to step 324. In step 324, the notify message 208 is forwarded by the marshaller mail server 164 to the work item mail server 148. The notify message 208 typically appears to the mail server 148 to be an email message sent to the contact center by the identified user. In other words, the sender address of the notify message is changed to be the email address of the identified user. This alteration helps the contact center track what user is actually sending the messages or posts to the forum server. A flag could be included in the email to notify the work item mail server 148 to forward the email to the mail server 164 rather than directly to the identified user. Alternatively, the sender address of the notify message 208 could be a unique internal email address of the corresponding user inbox for the posting user to enable the email to be returned to the correct inbox. The email address of the corresponding user inbox may be different from the posting user's actual email address but is linked in some fashion to the profile of the posting user maintained in storage 140. The notify message 208 is treated by the contact center 100 work distribution engine as a work item 210 to be distributed to an agent for servicing. The topic information in the work item 210 permits efficient routing to an appropriate agent for servicing. Accordingly, the notify message 208 is directed initially to only one, and not multiple, selected agents, thereby avoiding duplication of servicing efforts by contact center personnel.

Control then returns to decision diamond 300.

Figure 4:
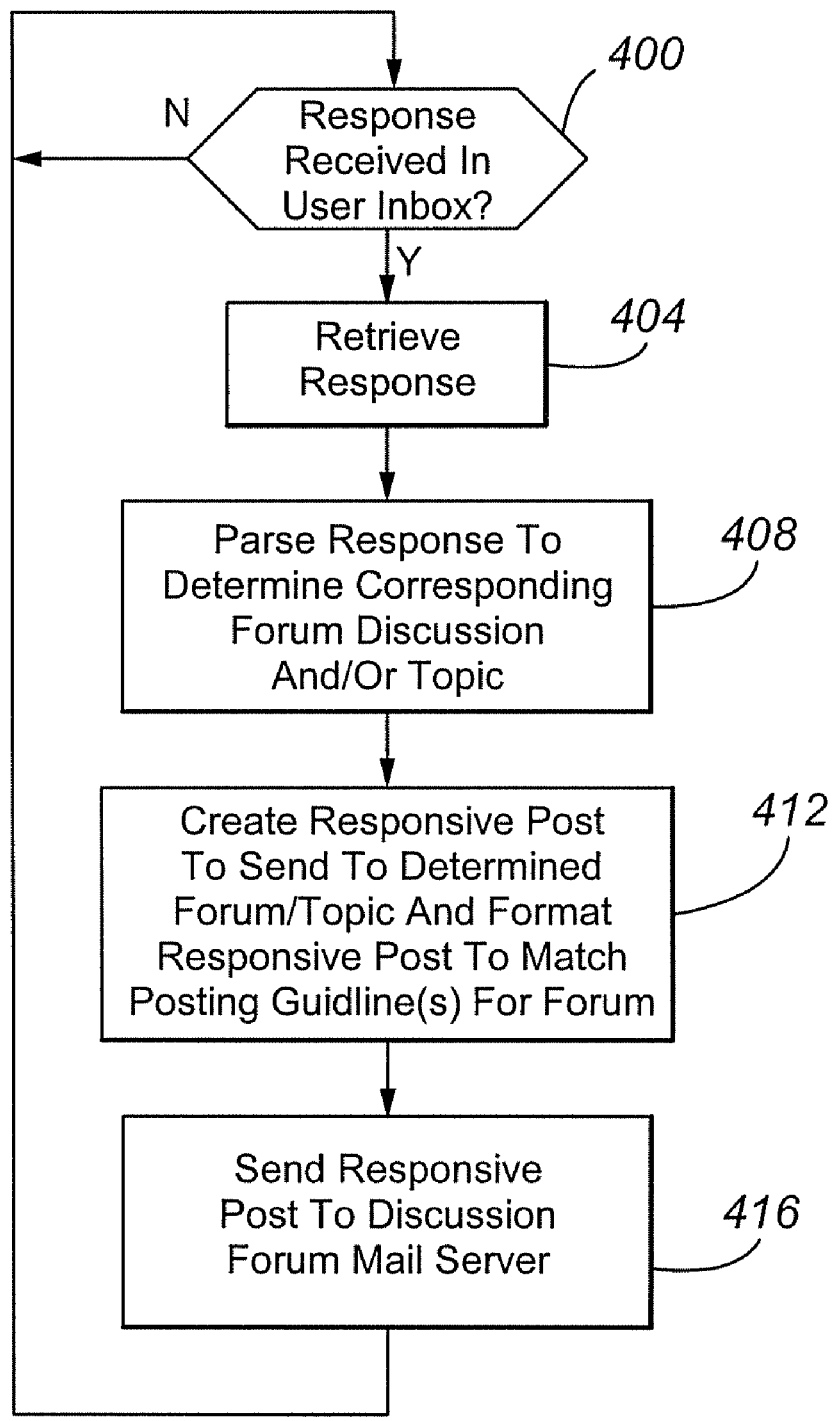
FIG. 4 is a flow schematic according to an embodiment of the present invention.

The operation of an embodiment of the present invention will now be discussed with reference to FIGS. 2 and 4. After the notify message 210, now in the form of work item 210, is serviced by the assigned agent, the agent forwards a response 212 to the work item mail server 148, which forwards the response 212 to the marshaller mail server 164. The server 164 places the response in the inbox 176 corresponding to the particular user referenced in the original notify message 208.

In decision diamond 400, the marshaller 168 determines whether a response has been received in any user inbox 176 and repeats decision diamond 400 until a response is received. When the response 212 appears in the inbox, the marshaller 168, in step 404, retrieves the response 212. Control then passes to step 408.

In step 408, the marshaller 168 parses the response 212 to determine which discussion forum (or sub-forum, thread and/or topic) to which the response should be sent as a post and optionally to which sub-forum, thread, and/or topic to which the post pertains.

In step 412, the marshaller 168 converts the response 212 into a responsive post 216 to send to the determined forum, sub-forum, thread and/or topic and formats the responsive post 216 to match posting guideline(s) for the forum. Typically, the responsive post 216 is configured as an email addressed from the marshaller mail server 164 to the discussion forum mail server 112.

Control then returns to decision diamond 400.

The discussion forum mail server 112 receives the responsive post 216 and forwards the responsive post 216 to the discussion forum server 108 for publication. A notify 220 is then generated and forwarded by the discussion forum server 108 to the discussion forum mail server 108. The mail server 112 then forwards the notify message 220 to the subscribing users, which includes the contact center 100.

Figure 5:
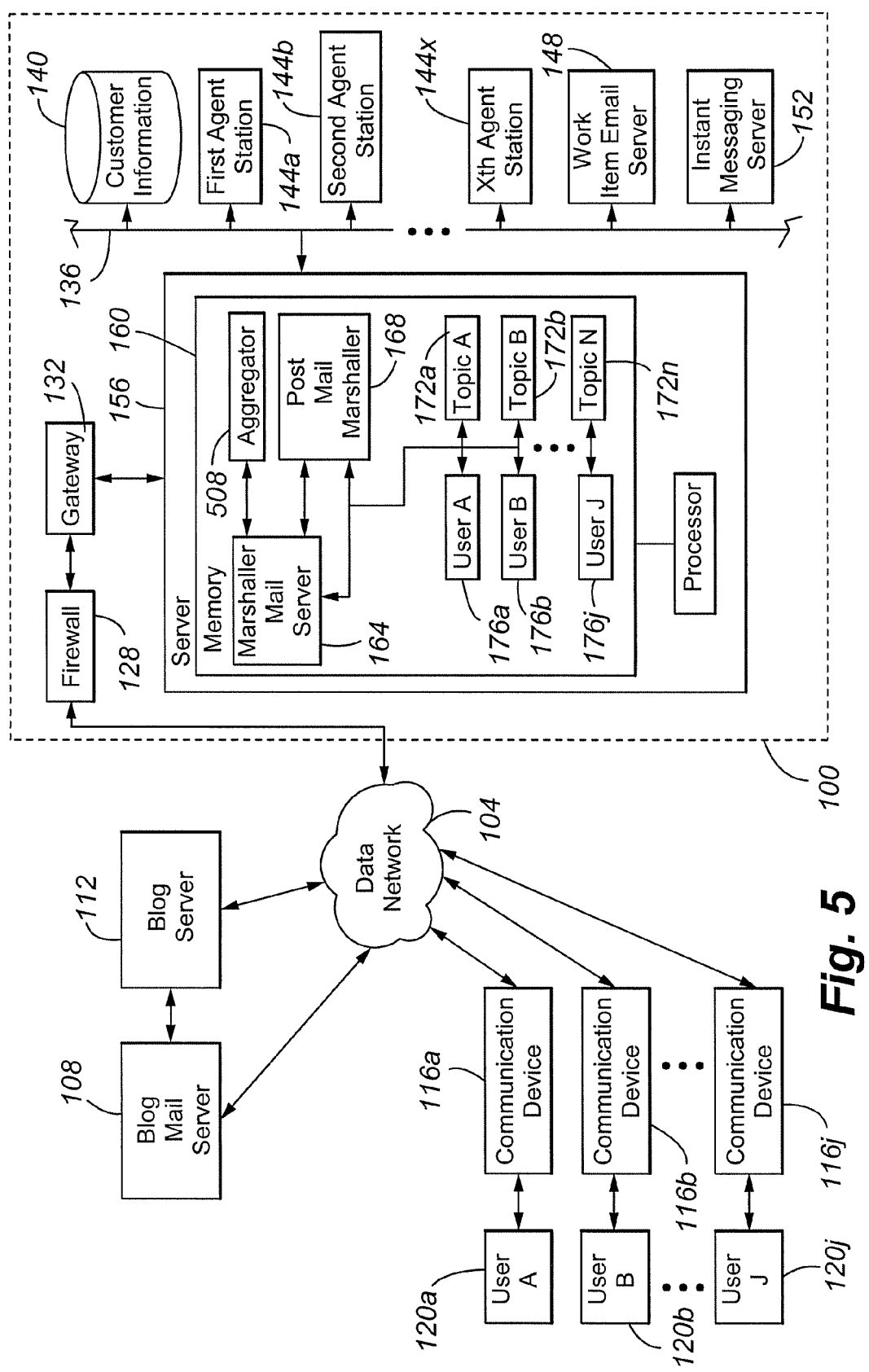
FIG. 5 is a block diagram of a contact center architecture according to an embodiment of the present invention.

FIG. 5 depicts a contact architecture according to another embodiment, which is useful for RSS feeds, such as blogs. The architecture includes many of the same elements as FIG. 1 except for a blog mail server 500, blog server 504, and aggregator 508. The primary difference between the embodiments of FIGS. 1 and 5 is how marshalling is done for RSS feeds. Communication between the blog server 504 and the post mail marshaller 168 is asymmetric in the embodiment of FIG. 5. When a message is posted to a blog, the notification for the post is delivered to the marshaller mail server 164 via an RSS feed. Stated another way, the notification is an RSS feed and is received by the aggregator 508. The aggregator 508 converts the notify, which is in the form of an RSS feed, to an email that is sent to an appropriate inbox 172. From there, the notify, now in the form of an email, is sent to the work item email server 148, as noted above for a forum posting. When the marshaller 168 receives from a servicing agent a response to the email, the email is forwarded to a user inbox 172, as noted above. The marshaller 168 converts the response to an email suitable for conveying content to be posted to the blog server 504. The response email is forwarded to the blog email server 500 to post the response to the blog.

A number of variations and modifications of the invention can be used. It would be possible to provide for some features of the invention without providing others.

For example in one alternative embodiment, the discussion forum and/or blog capability is natively supported by the contact center. In this embodiment, the discussion forum server 108 and mail server 112 and/or blog server 504 and mail server 500 are part of the contact center premises or enterprise network 100. The server 156 may not include a marshaller mail server 164, aggregator 508, or post mail marshaller 168. Each post in the forum/blog results in the generation of a task, which is then routed initially to a single agent. The task is identified or flagged as being from the forum or blog server, as appropriate. The agent would be able to view the discussion forum thread as one would on the web and post a reply using the provided client software. In short, this approach makes the contact center forum or blog aware, from server to agent client. However, the users 120a-j would necessarily need to use the forum/blog of the contact center and are prevented from using a forum/blog maintained by a server external to the contact center.

In another alternative embodiment, instant messages from customers are converted into emails by the contact center, which are then forwarded to an agent for servicing. When the responses are received, they are converted into instant messages and returned to the pertinent customer. The customer handle in the instant message can be used to maintain the thread when the instant message is converted to email and the response back to an instant message. The handle can also be used as a pointer to the customer's profile in storage 140.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory.

Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. In a contact center associated with an organization comprising a plurality of agents servicing work items, a method, comprising:
   (a) the a contact sever-center executing a marshaller mail server, a post-email marshaller, and a work item server;
   (b) the marshaller mail server subscribing to at least one of a forum server and a blog server;
   (c) the marshaller mail server receiving, from at least one of a-the forum and the blog server, a notify message addressed to the marshaller mail server, wherein the notify message is associated with a posting on the at least one of the forum server and blog server, wherein the posting is from a customer and relates to a product or a service of the organization;
   (d) the marshaller mail server mail server directing the notify message to a first contact center inbox associated with the at least one of a forum server and blog server; and
   (e) the post email marshaller parsing the notify message received in the first contact center inbox to determine a customer identifier for the customer that made the post;
   (f) the post email marshaller determining if a user inbox exists for the customer associated with the customer identifier;
   (g) if no user inbox exists, create user inbox;
   (h) if a user inbox exists or after a user inbox is created, the marshaller mail server forwarding the notify message to the work item server, wherein, to the work item server, the notify message appears to be sent from the customer from the customer inbox; and
   (h) the work item server distributing the notify message as a work item to an agent for servicing the work item, wherein the work item includes the customer's request regarding the product or the service of the organization as presented in the posting.

2. The method of claim 1,
   (i) the work item server receiving, from the agent, a response to the work item;
   (j) the work item server forwarding the response to the marshaller mail server, wherein the response is directed to the user inbox associated with a customer;
   (k) the marshaller mail server placing the response in the user inbox;
   (l) the post email marshaller determining if a response has been received in the user inbox;
   (m) the post email marshaller converting the response into a responsive post to send to the either the forum server or the blog server;
   (n) the marshaller mail server sending the responsive post to either the forum server or the blog server to respond to the post from the customer.

3. The method of claim 1, wherein step (e) comprises the sub-steps:
   (e1) parsing the notify message to determine the customer identifier, the customer identifier being associated with the customer posting at least part of the text message to the at least one of a forum server and blog server;
   (e2) determining whether the customer identifier is associated with the contact center;
   (e3) in response to the customer identifier being associated with the contact center, not directing the notify message to the work item server for servicing; and
   (e4) in response to the customer identifier not being associated with the contact center, directing the notify message to the work item server for servicing.

4. The method of claim 3, wherein the first contact center inbox is associated with at least one of a topic and thread of the at least one of a forum server and blog server, wherein the customer identifier is in the body and not header of the notify message, wherein the contact center has a plurality of contact center inboxes, each being associated with a different forum or blog server, and wherein a message derived from the notify message is directed to the work item server, the directed message having at least one of the customer identifier or the user inbox associated with the customer identifier as a sender of the directed message.

5. The method of claim 1, wherein step (e) comprises the sub-steps:
   (e1) in response to a user inbox not existing for the customer identifier, the post email marshaller creating the user inbox for the customer identifier; and
   (e2) in response to a user inbox already existing for the customer identifier, post email marshaller not creating a further contact center inbox for the customer identifier.

6. The method of claim 1, wherein the notify message is an email derived from an RSS feed and comprising at least part of the information in the RSS feed.

7. In a contact center comprising a plurality of agents servicing work items, a method, comprising:
   the marshaller mail server subscribing to at least one of the forum server and the blog server;
   the marshaller mail server receiving, from at least one of the forum and the blog server, a notify message addressed to the marshaller mail server, wherein the notify message is associated with the posting on the at least one of the forum server and blog server, wherein the posting is from the customer and relates to a product or a service of the organization;
   the marshaller mail server directing the notify message to a first contact center inbox associated with the at least one of a forum server and blog server;
   the post email marshaller parsing the notify message received in the first contact center inbox to determine a customer identifier for the customer that made the post;

the post email marshaller determining if a user inbox exists for the customer associated with the customer identifier;
if no user inbox exists, creating user inbox;
if user inbox exists for the customer or after a user inbox is created, the marshaller mail server forwarding the notify message to the work item server, wherein, to the work item server, the notify message appears to be sent from the customer or from the customer inbox;
the work item server distributing the notify message as the work item to the agent for servicing the work item, wherein the work item includes the customer's request regarding the product or the service of the organization as presented in the posting;
(a) the contact center executing a marshaller mail server, a post-email marshaller, and a work item server;
(b) the work item server receiving from an agent a response to a work item, wherein the work item is a response to an email received from a post-email marshaller for a customer associated with a posting to at least one of a forum server and blog server;
(c) the work item server directing the response to a user inbox associated with the customer at a marshaller mail server; and
(d) from the user inbox, the post-email marshaller converting the response into a posting for the forum server or the blog server; and
(e) the marshaller mail server directing posting to the forum server or the blog server.

8. The method of claim 7, wherein the at least one of a forum server and blog server comprises a plurality of the at least one of a forum server and blog server and wherein step (e) comprises the substeps:
(e1) the post email marshaller parsing the response to determine which of the plurality of the at least one of a forum server and blog server to send the response or a message derived therefrom;
(e2) converting the response into an email addressed from the contact center to the corresponding at least one of a forum server and blog server, the email complying with posting guidelines of the at least one of a forum server and blog server; and
(e3) forwarding the email to the marshaller mail server to send to the corresponding at least one of forum server and blog server.

9. The method of claim 7, wherein determining if a user inbox exists for the customer comprises the sub-steps:
parsing the notify message to determine a customer identifier, the customer identifier being associated with the customer posting at least part of the text message to the at least one of a forum sewer and blog server;
determining whether the customer identifier is associated with the contact center;
in response to the customer identifier being associated with the contact center, not directing the notify message to the work item server for servicing; and
in response to the customer identifier not being associated with the contact center, directing the notify message to the work item server for servicing.

10. The method of claim 9, wherein the first contact center inbox is associated with at least one of a topic and thread of the at least one of a forum server and blog server, wherein the customer identifier is in the body and not header of the notify message, wherein the contact center has a plurality of contact center inboxes, each being associated with a different forum or blog server, and wherein a message derived from the notify message is directed to the agent, the directed message having the customer identifier or the first contact center inbox associated with the customer identifier as the sender of the directed message.

11. The method of claim 7, wherein step comprises the sub-steps:
parsing the notify message to determine a customer identifier, the customer identifier being associated with the customer posting at least part of the notify message to the at least one of a forum server and blog server;
determining whether the customer identifier is currently associated with a contact center inbox;
in response to the customer identifier not currently being associated with a user inbox, creating a user inbox for the customer identifier; and
in response to the customer identifier currently being associated with a user inbox, not creating a further user inbox for the customer identifier.

12. The method of claim 7, wherein the notify message is an email derived from an RSS feed and comprising at least part of the information in the RSS feed.

13. A contact center, comprising:
a processor;
a memory;
a plurality of topic inboxes, each topic inbox operable to receive a notify message received from one of a forum server or a blog server, wherein the notify message is associated with a post on the forum server or the blog server, and wherein the post is associated with a request from a customer about a product or service of an organization;
a plurality of user inboxes, each user inbox operable to receive a notify message associated with a customer; and
a work item server operable to receive the notify message from a user inbox, operable to send a work item associated with the notify message to an agent, operable to receive a response from the agent associated with the work item, and operable to send the response back to the user inbox;
a marshaller mail server in communication with the plurality of topic inboxes, the plurality of user inboxes, and the work item server, the marshaller mail server operable to receive the notify message from the forum server or blog server, operable to send the notify message to a topic inbox, operable to send a notify message to the work item server, wherein the notify message appears to have been sent from a user inbox, operable to receive the response from the work item server, operable to put the response into the user inbox, operable to receive a response post, and operable to send the response post to the forum server or the blog server,
a post email marshaller in communication with the with the plurality of topic inboxes, the plurality of user inboxes, and the marshaller mail server, the post email marshaller operable to parse the notify message received in the topic inbox to determine a customer identifier for the customer, operable to send the notify message to the user inbox for the customer and identified by the customer identifier, operable to determine a response has been received from the work item server, and operable to convert the response into a response post for the marshaller mail server.

14. The contact center of claim 13, wherein if no response has been received, the post email marshaller waits for the response.

15. The contact center of claim 14, wherein the post email marshaller is further operable to:
- determine whether the customer identifier is associated with the contact center;
- in response to the customer identifier being associated with the contact center, not directing the notify message to the work item server for servicing; and
- in response to the customer identifier not being associated with the contact center, directing the notify message to the work item server for servicing.

16. The contact center of claim 15, wherein the notify message sent to the work item server includes a flag indicating that the work item server should send the response to the marshaller mail server instead of the customer.

17. The contact center of claim 16, wherein contact center is in communication with a plurality of forum servers and blog servers and wherein the post email marshaller is further operable to:
- parse the response from the work item server to determine which of the plurality of the forum servers and blog servers to send the response post;
- convert the response into an email addressed from the contact center to the corresponding forum server or blog server, the email complying with posting guidelines of the forum server or blog server; and
- forwarding the email to the corresponding forum server or blog server.

18. The contact center of claim 14, wherein the post email marshaller is further operable to:
- determine whether the customer identifier is currently associated with a user inbox;
- in response to the customer identifier not currently being associated with a user inbox, create a user inbox for the customer identifier; and
- in response to the customer identifier currently being associated with a user inbox, not create a further user inbox for the customer identifier.

19. The contact center of claim 14, wherein the topic inbox is associated with at least one of a topic and thread of the at least one of a forum server and blog server, wherein the customer identifier is in the body and not header of the first text message, wherein the contact center has a plurality of topic inboxes, each being associated with a different forum or blog server, and wherein a message derived from the notify message is directed to the agent, the directed message having the customer identifier or the user inbox associated with the customer identifier as the sender of the directed message.

20. The contact center of claim 14, wherein the notify message is derived from an RSS feed and is an email comprising at least part of the information in the RSS feed.

* * * * *